May 20, 1924.

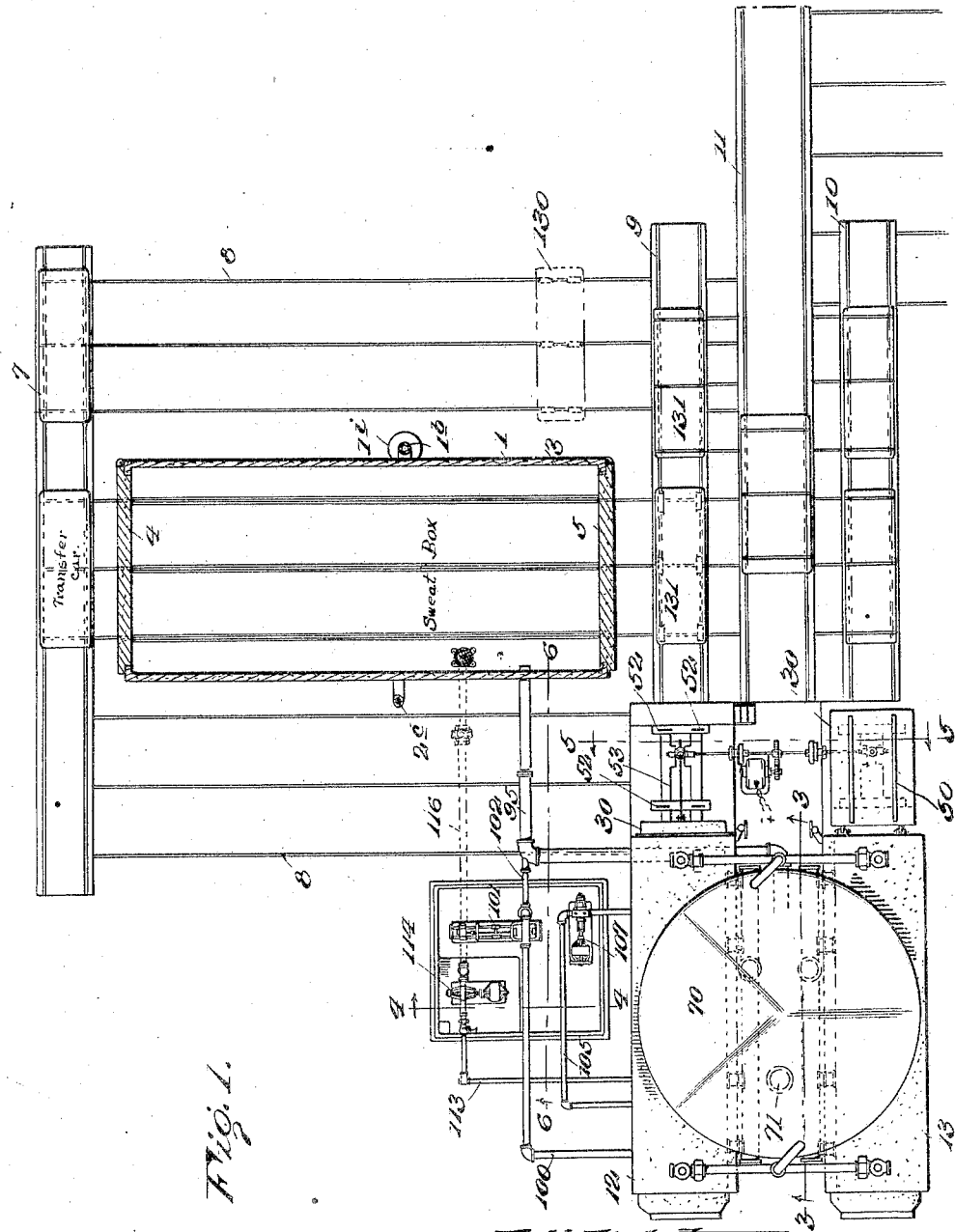

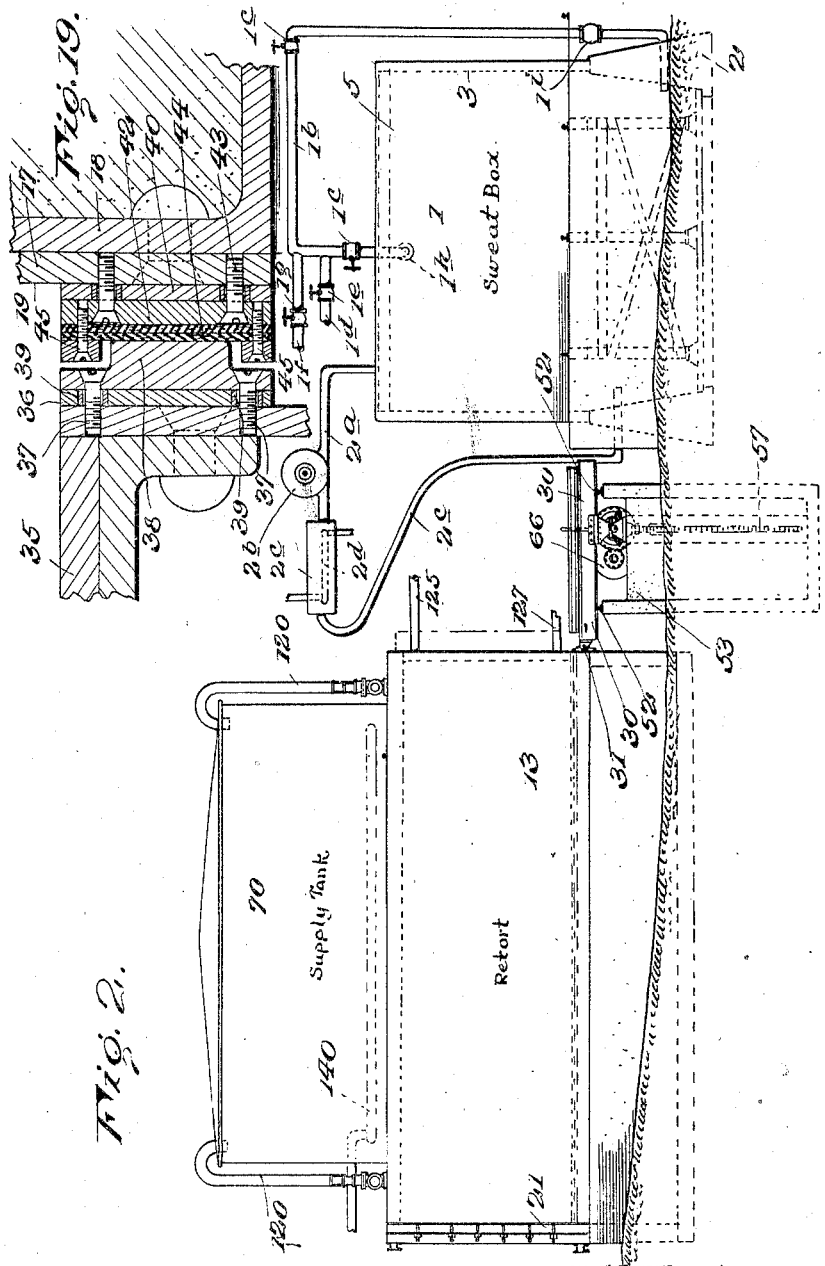

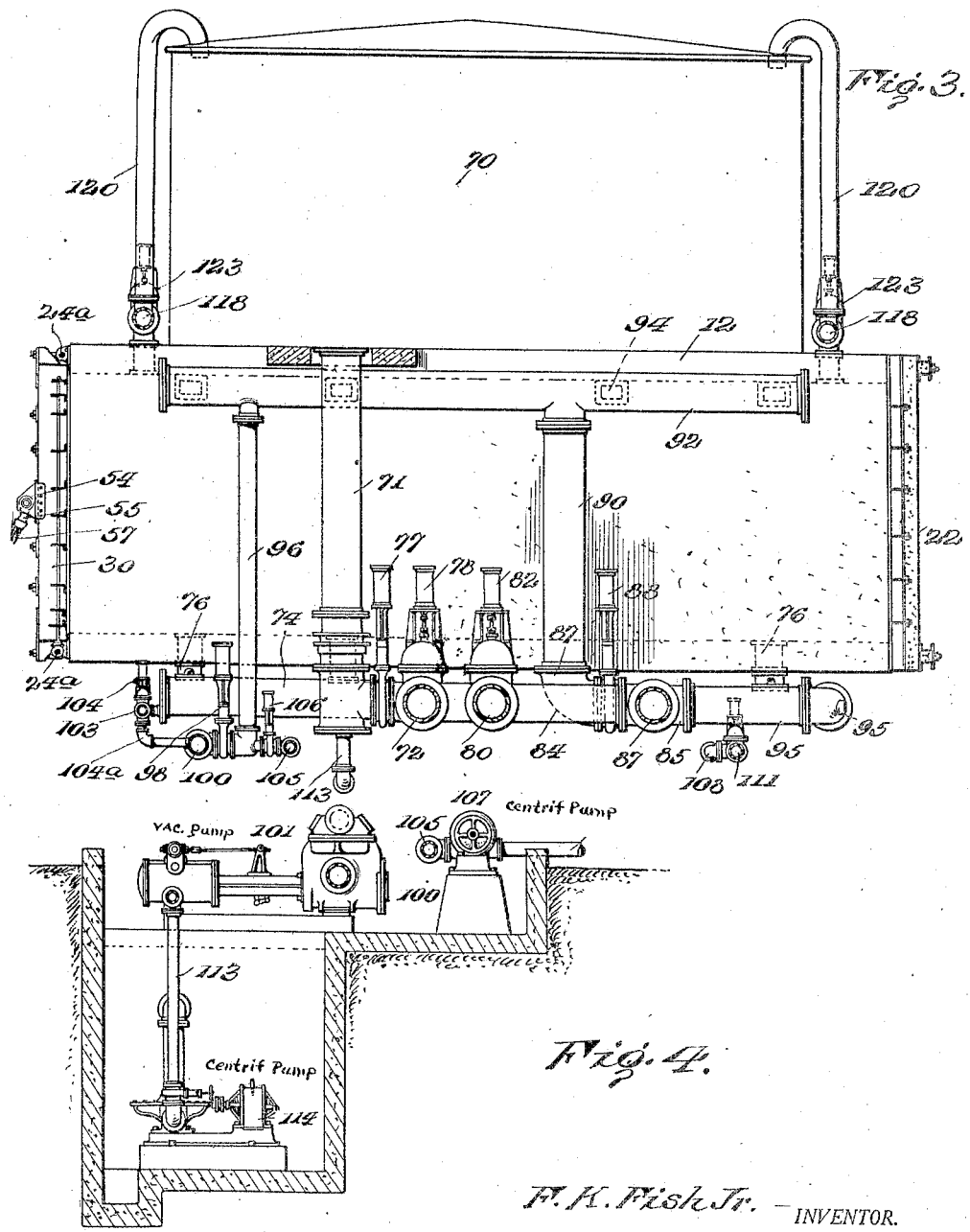

F. K. FISH, JR 1,494,536

PLANT AND RETORT FOR TREATMENT OF WOOD, ETC.

Original Filed Dec. 1, 1920    12 Sheets-Sheet 4

F. K. Fish Jr. — INVENTOR.

BY

ATTORNEY.

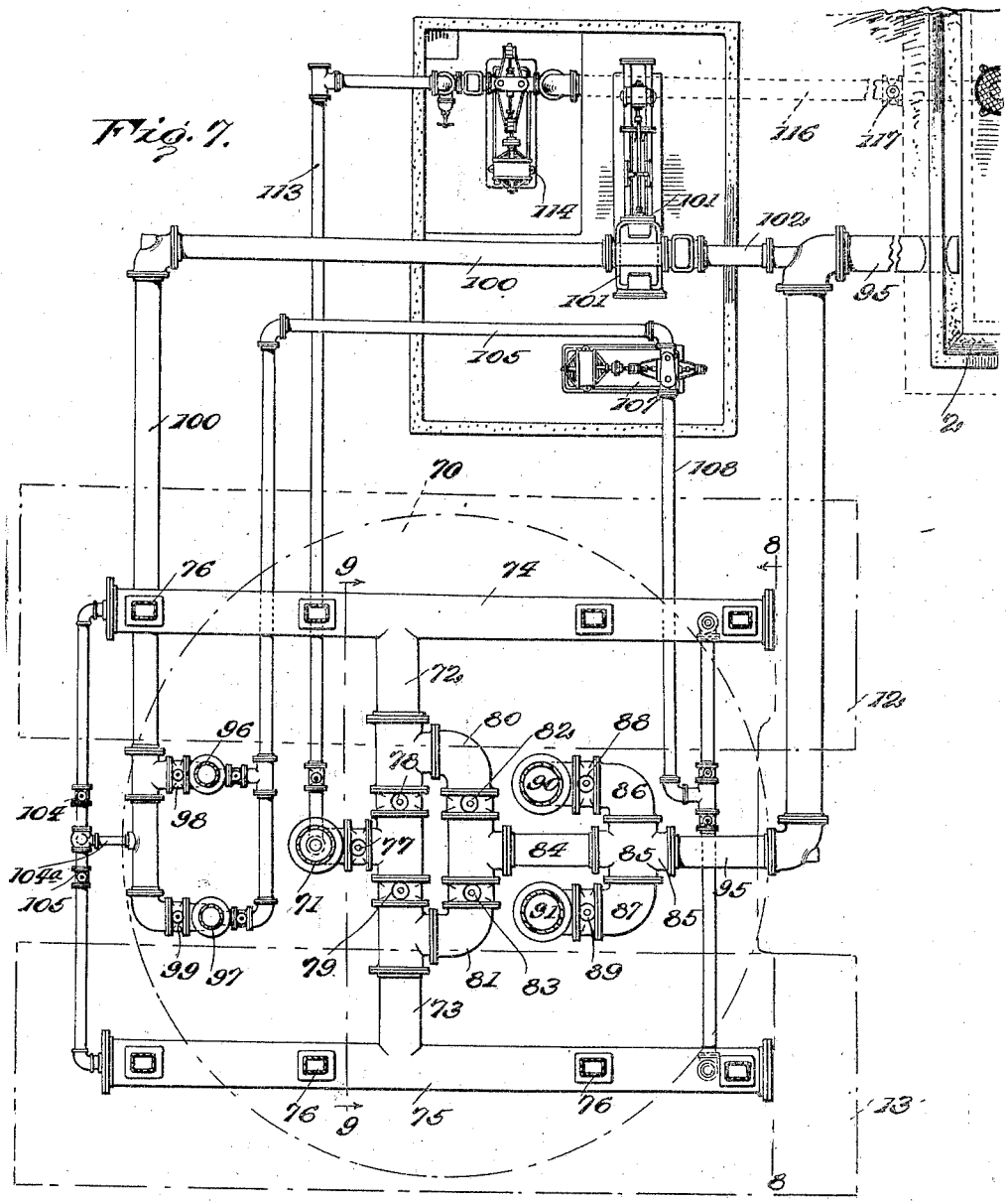

May 20, 1924.
F. K. FISH, JR
1,494,536
PLANT AND RETORT FOR TREATMENT OF WOOD, ETC
Original Filed Dec. 1, 1920   12 Sheets-Sheet 6
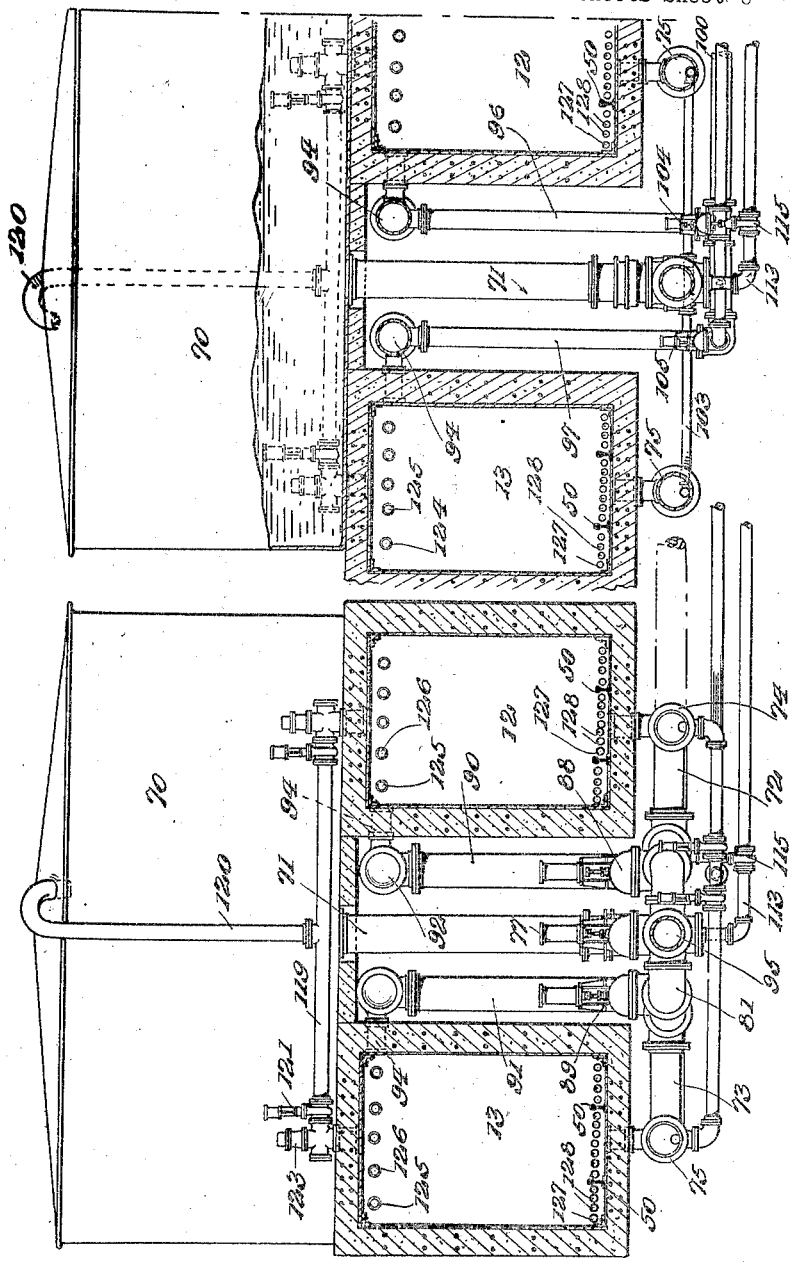
INVENTOR.
BY
ATTORNEY.

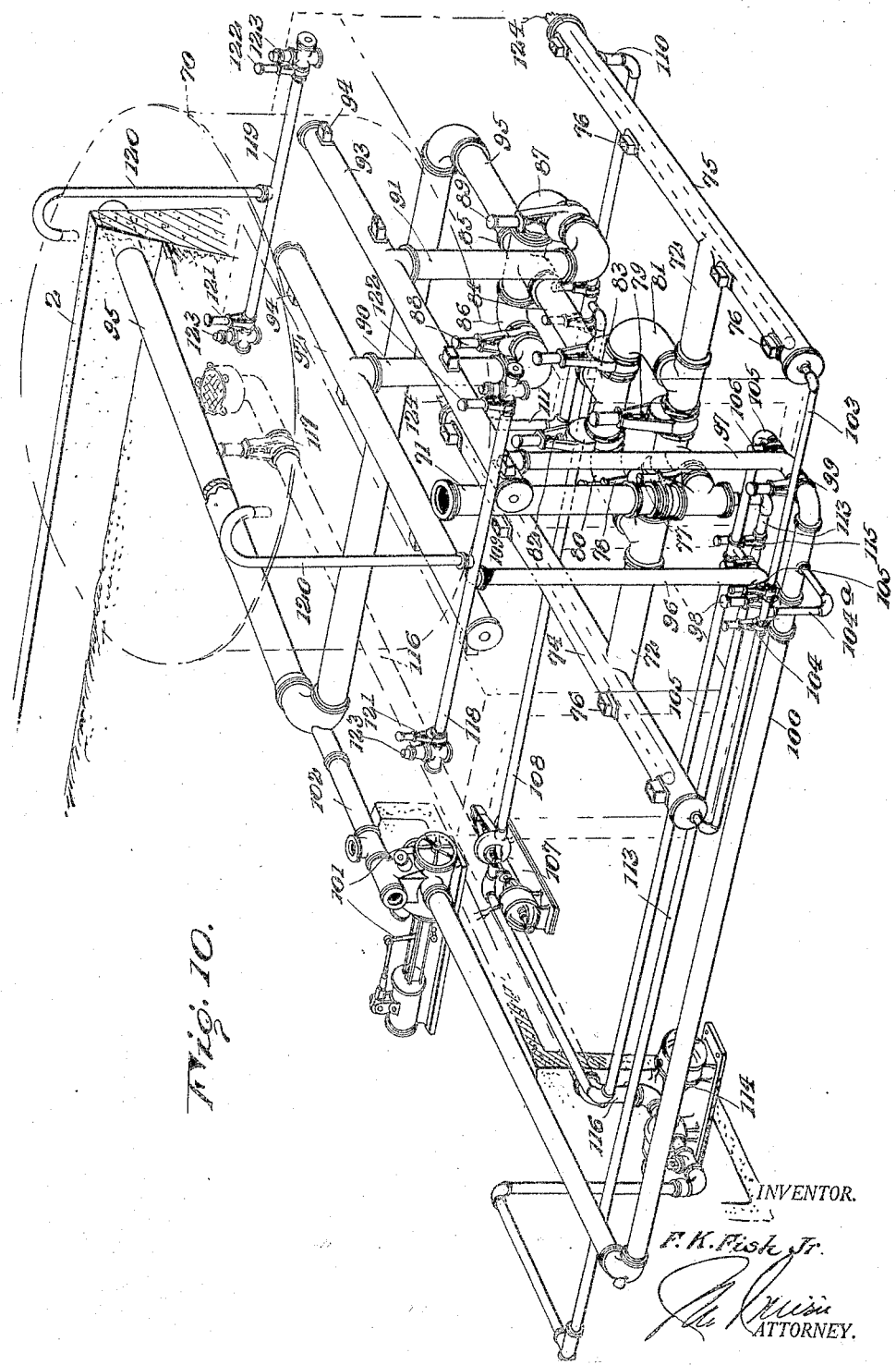

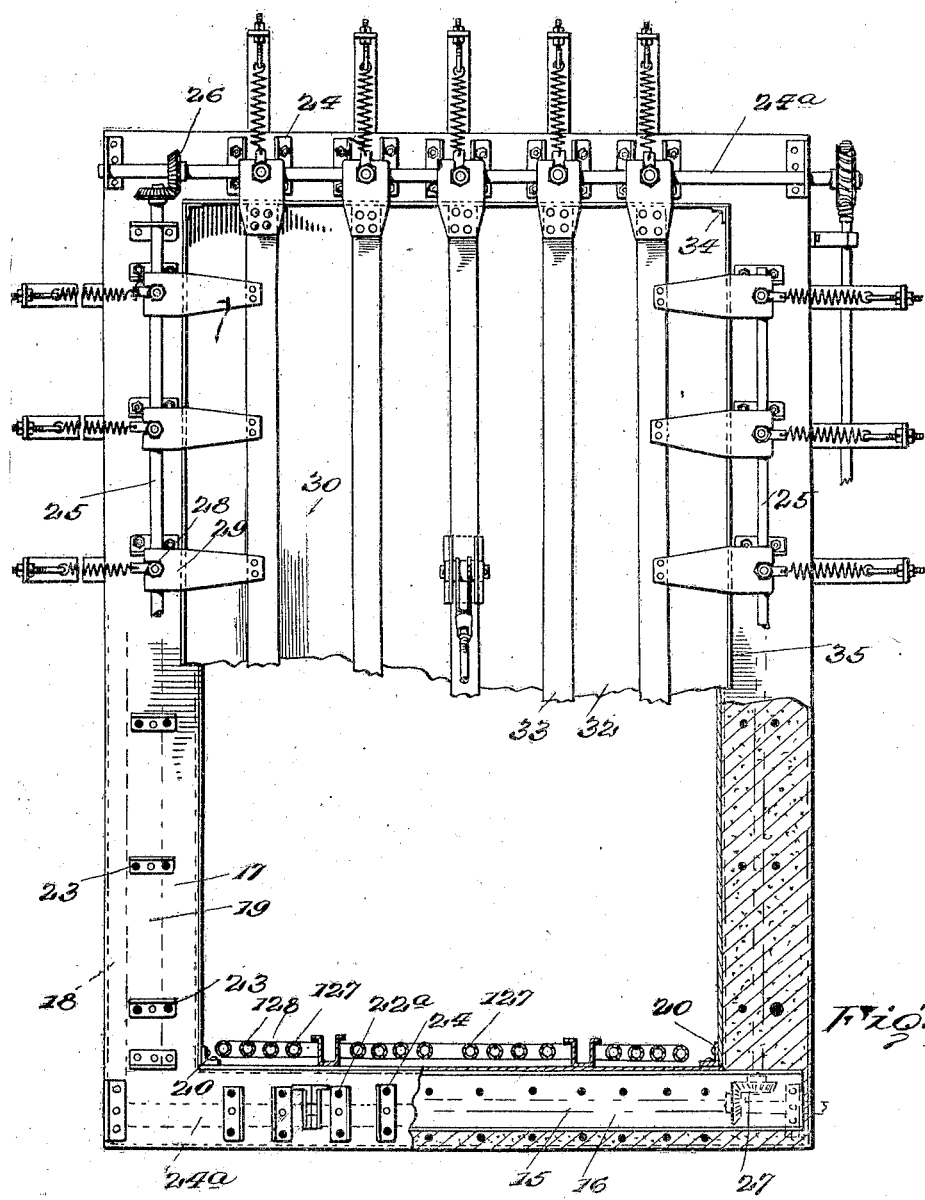

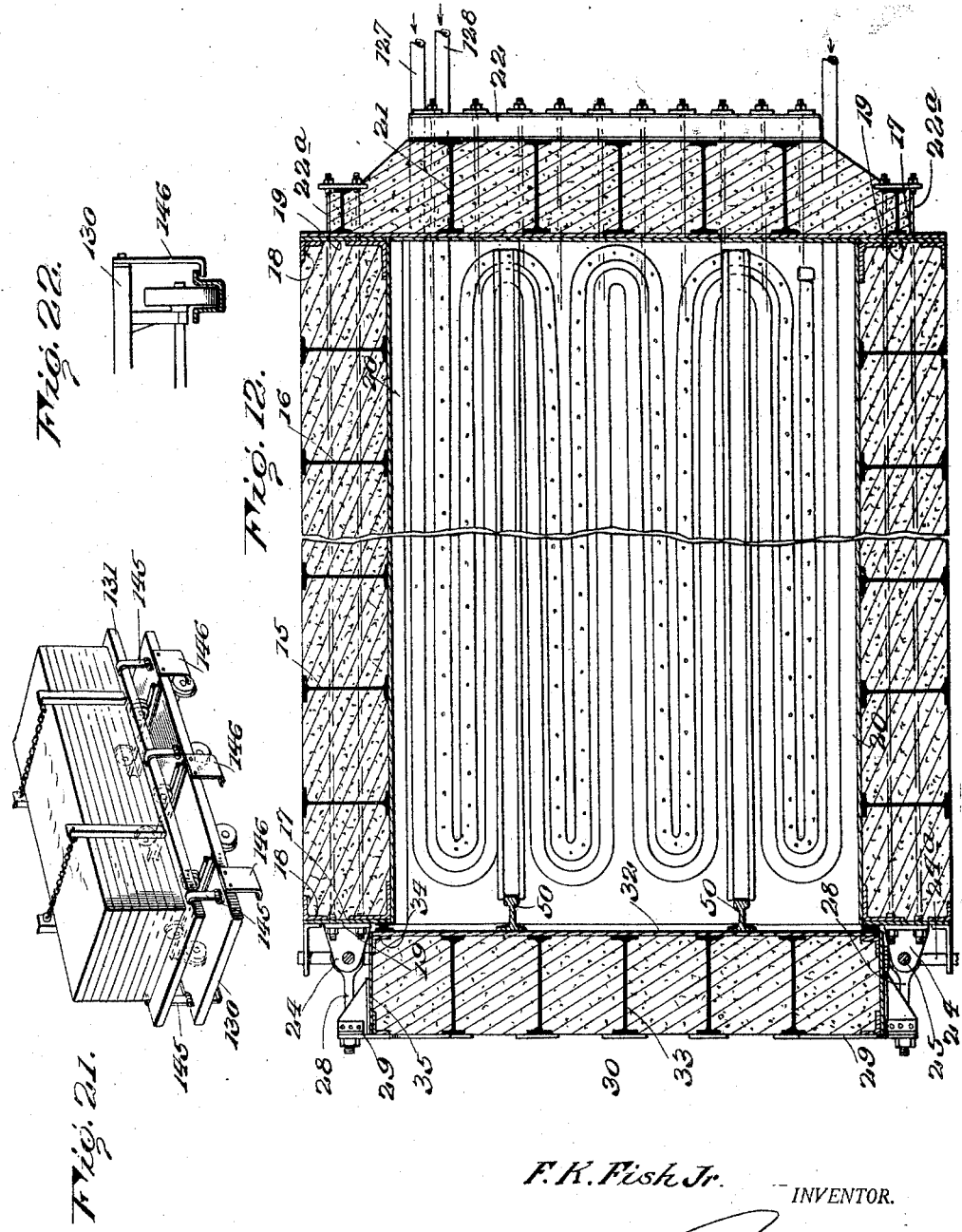

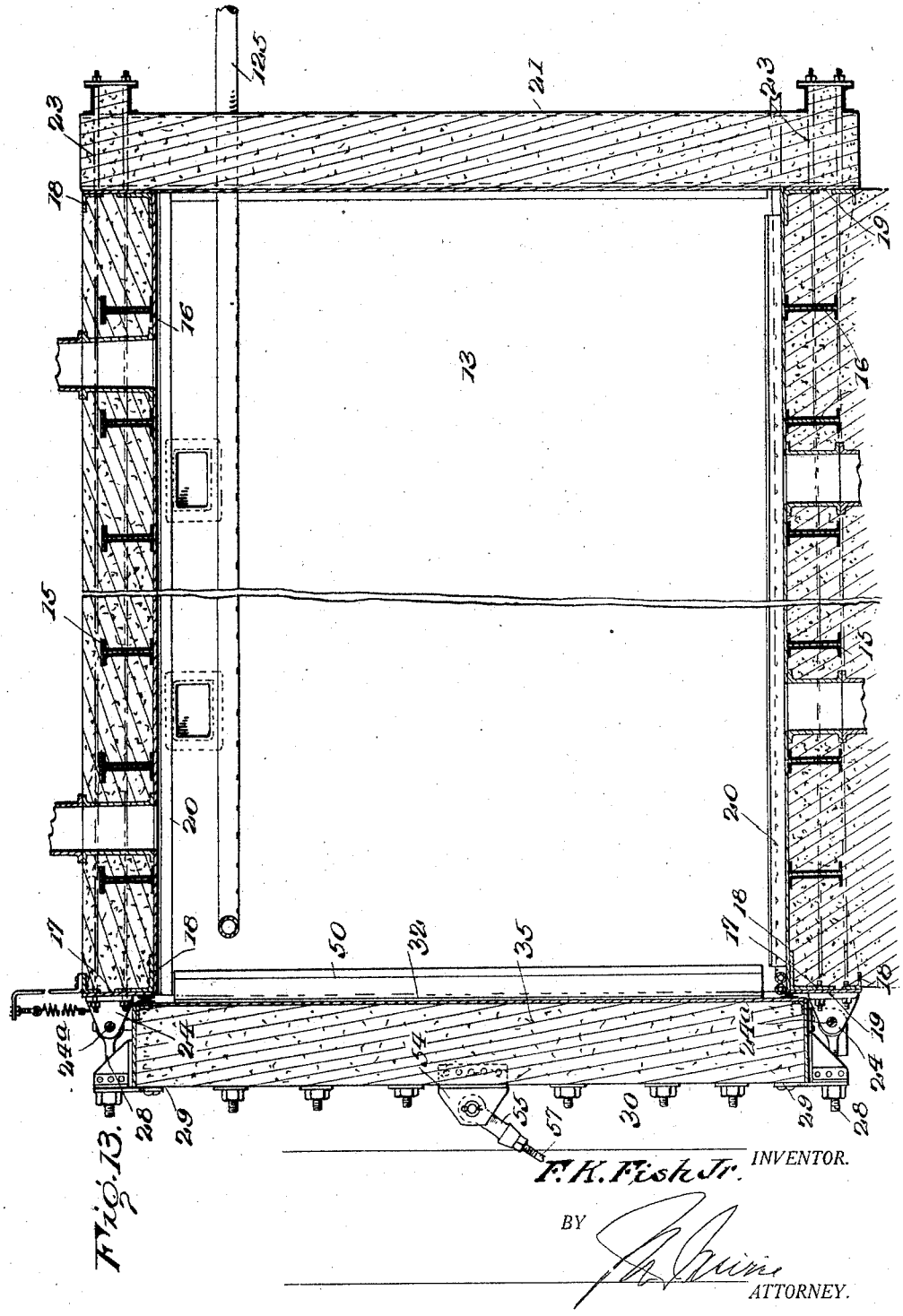

May 20, 1924.
F. K. FISH, JR
1,494,536
PLANT AND RETORT FOR TREATMENT OF WOOD, ETC
Original Filed Dec. 1, 1920    12 Sheets-Sheet 12
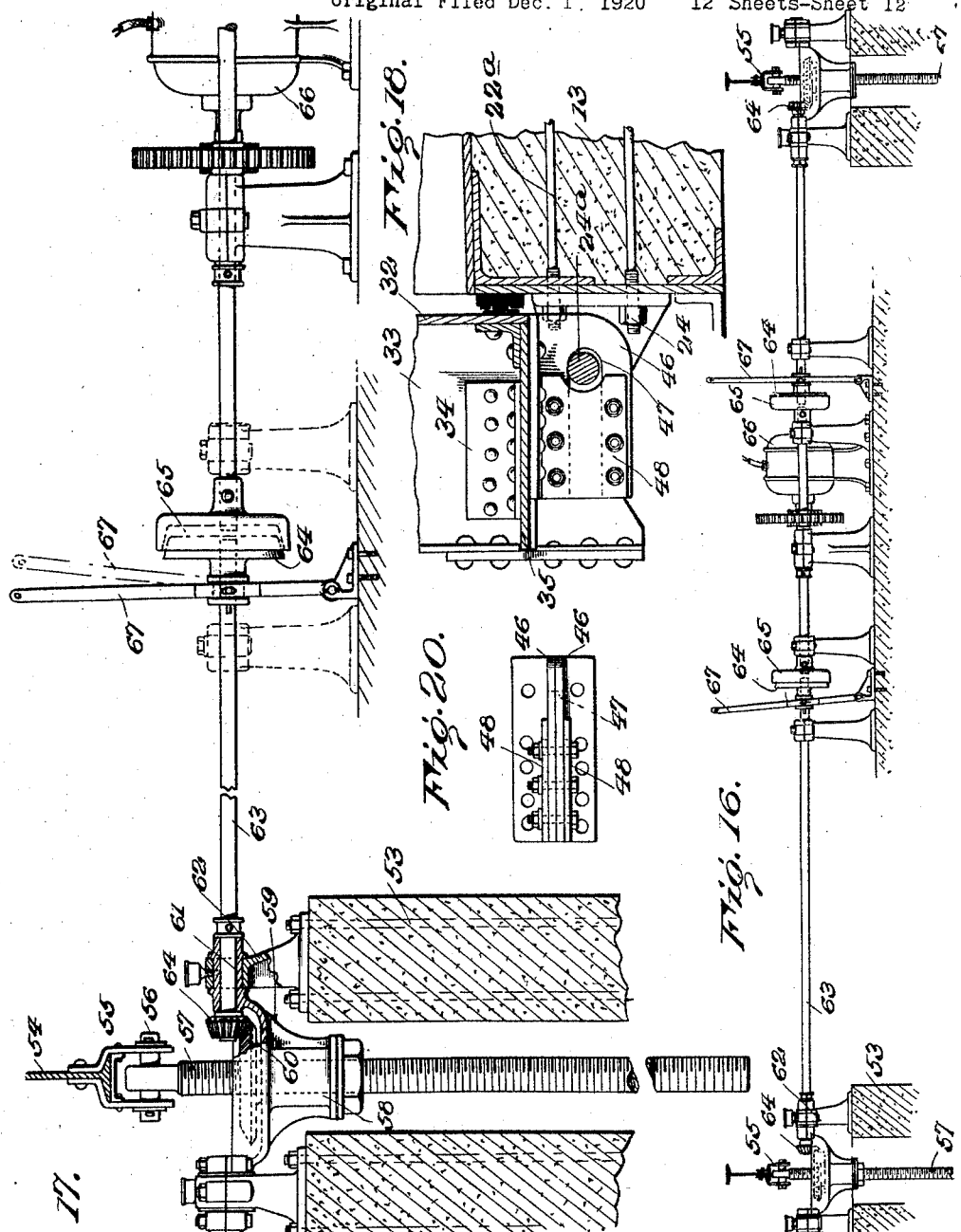
INVENTOR.
F. K. Fish Jr.
BY
ATTORNEY.

Patented May 20, 1924.

1,494,536

UNITED STATES PATENT OFFICE.

FREDERICK K. FISH, JR., OF SAN FRANCISCO, CALIFORNIA.

PLANT AND RETORT FOR TREATMENT OF WOOD, ETC.

Application filed December 1, 1920, Serial No. 427,609. Renewed August 9, 1923.

*To all whom it may concern:*

Be it known that FREDERICK K. FISH, Jr., a citizen of the United States, residing at San Francisco, in the county of San Francisco and State of California, has invented certain new and useful Improvements in a Plant and Retort for Treatment of Wood, Etc., of which the following is a specification.

This invention relates to improvements in a wood treating plant and system for handling the material being treated.

In treating wood to dry it, or in the extraction of the soluble and insoluble constituents therefrom it is of the utmost importance that the water employed be conserved, and the vapors arising incident to the treatment be trapped and condensed to be utilized in the operation of the plant. To commercially and practically effect these results, it is essential that the various units forming the plant layout be disposed and arranged so that the initial supply of water, can with convenience and rapidity be directed to the point of action, and when its mission is accomplished it must, with equal speed and convenience be conveyed to another unit for use, or be conserved for future use. So also must the vapors be under such control that they may be conserved and conveyed to points of use in the treatment of the material, and finally directed to a collector where the condensate will be preserved to enrich the water utilized in the system.

It is therefore one of the principal objects of the present invention to provide a plant in which the water is initially stored in a reservoir, and by a system of pipes and valves, said water may be suddenly introduced into a retort containing the wood, and when the treatment is finished this water may be conveyed to a tank, and the vapors arising therefrom utilized to sweat the wood previous to the water treatment, or such water may, by pressure, be conveyed to a companion retort and used for a similar wood treatment. Means are also provided for returning the water from the tank to the reservoir.

Another object of the invention is to provide in a wood treating plant means wherein the water and the vapors are at all times retained in confinement to prevent loss of pressure, escape of the volatile vapors, or the loss of water, hence as the volatile extractives are liberated either in the form of vapor or as the solids are released and held in suspension or emulsion. They are conserved and mixed with the water, to be subsequently employed to dissolve and remove the soluble constituents, and melt the resins in the treament of the wood.

A still further object of the invention is to provide a sweat chamber, and a pair of wood treating retorts operable in conjunction therewith, with means for drawing a vacuum in either of said retorts at a time when free of water, or when containing water and in either or both instances conveying the air vapors ladened with the extractives of wood to said sweat chamber to act on the wood contained therein, previous to introduction to the retort or retorts.

My invention therefore comprehends a plant embodying a sweat chamber formed at its bottom with a receiving tank provided with means for introducing steam hot air, superheated vapors thereto; a pair of retorts disposed with reference to the sweat chamber so that the wood can after sweating, be conveniently removed from the chamber and conveyed to the retorts; a system of pipes and valves so arranged that the water can be conveyed from a reservoir to either or both of the retorts, or from those passed to the tank for sweating the wood, and finally returned to the reservoir for further reuse; and a system of pipes and pumps for drawing a vacuum at will in either or both retorts; the arrangement and disposition of the units being such that the same charge of water in the reservoir is used over and over again until it becomes heavily ladened with the wood extractives.

In the operation of my improved plant the water when employed in the retorts is superheated, and to expedite the operation the reservoir is provided with means for maintaining the water therein to or about the boiling point. To further assist in this action steam is introduced into the water in the retort, which results in the wood which has now been highly heated in the sweat chamber being quickly acted upon by the superheated water to dissolve and remove the soluble constituents and melt the resins. It follows therefore that when a load of wood is being preliminarily treated in the sweat chamber to prepare it for the action of the super-heated water, other loads of wood are being treated by the super-heated water in the retorts.

In addition to the foregoing objects, my invention also comprehends improvements in the construction and arrangement of parts which will be hereafter described and particularly pointed out in the claims.

In the accompanying drawings:

Fig. 1 is a plan view of the entire plant.

Fig. 2 is a side elevation of the same.

Fig. 3 is a longitudinal section on the line 3—3 of Fig. 1.

Fig. 4 is a detail section on the line 4—4 of Fig. 1.

Fig. 7 is a plan view partially in section, illustrating the retorts in dotted lines, and the lower headers, and pipe connections, the upper headers being omitted.

Fig. 8 is a cross section on the line 8—8 of Fig. 7.

Fig. 9 is a similar section on the line 9—9 of Fig. 7.

Fig. 10 is a diagrammatic perspective view of the system of pipes and valves employed in connection with the plant.

Fig. 11 is a front elevation, partially in section of one of the retorts.

Fig. 12 is a horizontal section of the retort.

Fig. 13 is a longitudinal section of the retort.

Fig. 16 is a front elevation of the means employed to control the doors of the retort.

Fig. 17 is an enlarged detail front view of a portion of same.

Fig. 18 is a detail section of the hinge connection between the door and retort.

Fig. 19 is a detail section of the packing between the door and the retort.

Fig. 20 is a detail bottom plan view of the hinge connection.

Fig. 21 is a diagrammatic view of the two transfer cars locked together.

Fig. 22 is a detail section of a car and the rail locking means.

Figure 5:
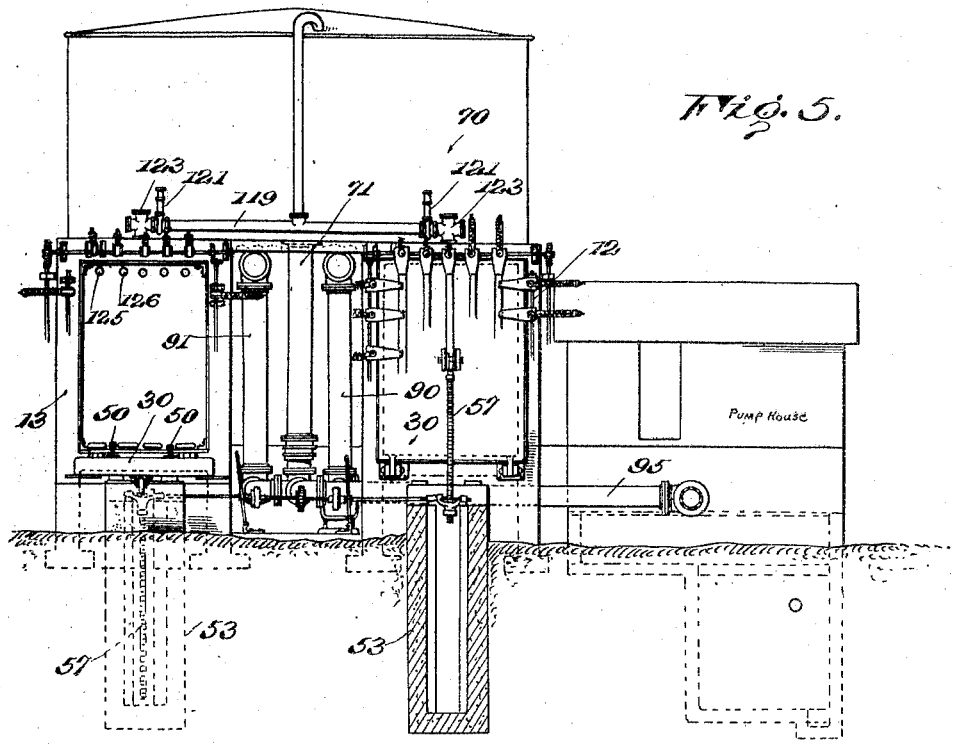
Fig. 5 is a section on the line 5—5 of Fig. 1.
Figure 6:
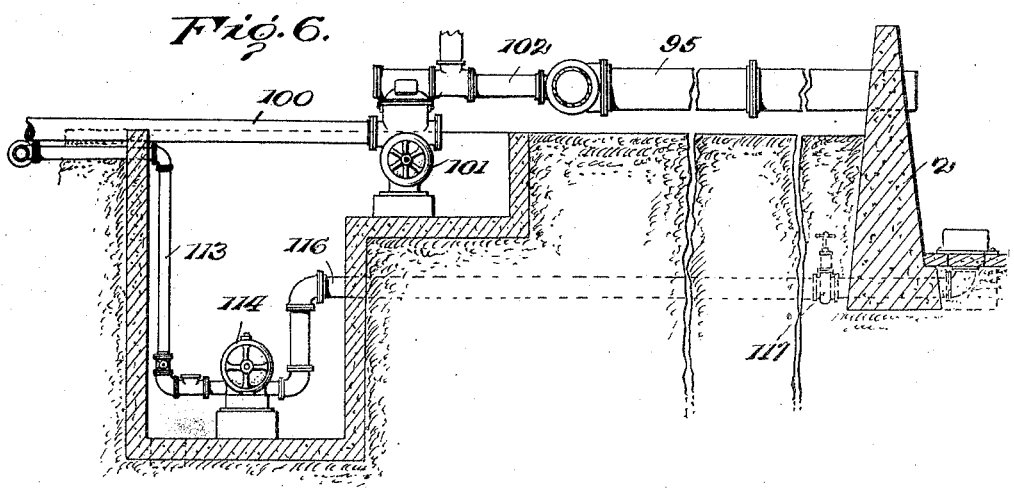
Fig. 6 is a section on the line 6—6 of Fig. 1.

1 indicates a sweat chamber, the lower portion of which is of concrete formation to provide a receiving tank 2, and built upon the latter is a shed structure 3, open at opposite ends, and provided with doors 4 and 5. A tank 6 extends longitudinally through the sweat chamber, for conveying the load of wood therein and therethrough. The sweat chamber is substantially air tight, save for an inlet and outlet pipe extending through the walls of the receiving tank, features which will be referred to in detail later on in this description.

Communicating at one end with the top of the sweat chamber is a pipe $1^b$, provided with a valve $1^c$, and communicating at the opposite end with the tank. A steam supply pipe $1^d$ having a valve $1^e$ and a cold water supply pipe $1^f$, having a valve $1^g$, communicates with the pipe $1^b$. The pipe $1^b$ is coupled with a spray pipe $1^h$ and it is provided with a pump $1^i$ to pump water from the bottom of the tank to the spray pipe.

The sweat chamber may also be provided with heating coils and perforated steam inlet pipes (not shown).

A valved pipe $2^a$ extends from the top of its sweat chamber, and intermediate its length is a fan $2^b$, said pipe leading into a hot box, $2^c$, provided with heating coils $2^d$. To the other side of the hot box leads a pipe $2^e$, which communicates with the lower portion of the sweat chamber, whereby the hot vapor from the top of the sweat chamber may be drawn through the hot box and reheated and while in this state introduced to the chamber to act on the wood.

Adjacent the outer end of the sweat chamber is a longitudinally disposed transfer track 7, and extending therefrom and on opposite sides of the sweat chamber are transversely disposed storage tracks 8; adjacent the inner end of the sweat chamber and the storage tracks are two longitudinally disposed tracks 9 and 10, suitably spaced apart, and in the space is a transfer track 11.

In alignment with the longitudinal tracks 9 and 10, are retorts 12 and 13, respectively, each being of substantially the same construction, and therefore but one will be specifically described.

Owing to the enormous strain the retorts are subjected to, due not only to the weight of the water, but to the pressure incident to the use of super-heated water and drawing of a vacuum, it is absolutely essential that the structure be strongly built, and of such material and character as will resist the strains, and at the same time be air tight, and yet be so constructed to permit ready introduction and removal of a load of wood.

The retort is preferably rectangular and comprises a plurality of U and I beams 15, to form transverse frames 16, suitably spaced apart. 17 indicates end frames composed of angle irons 18, and face plates 19. Secured to the inner flanges of the frames 16 and 17, is a metal lining fastened in the corners by longitudinal angle irons 20. In the spaces formed by the transverse frames is concrete, same being of sufficient thickness beyond the edges of the frames to lend strength to the structure. The front of the retort is open while the rear is preferably permanently closed, said rear wall comprising a flat plate which fits snug against the rear end of the end frame 17, and supported against said plate are vertically disposed I beams 21, connected at their upper and lower ends by transverse beams 22. Extending longitudinally through the I beams 21, the frames 16 and 17, and the intermediate thickness of concrete are pairs of anchor rods 22ª, provided at their rear ends with nuts to bolt up the rear end section and form a tight joint to prevent the escape of water or pressure. Between the vertical I beams 21 is a concrete mass to lend strength and rigidity to the structure. Short transverse plates are located at the rear and in alignment with the vertical legs of the frames 16 and 17, and through these short plates extend anchor rods 23, which also pass through the frame and the intervening concrete. On the front end frame are vertical and horizontally disposed bearing brackets 24, the angle flanges of the latter receiving the forward ends of the anchor rods 22 and 23, provided with nuts to bolt up the structure. Rotatively mounted in the bearing brackets are upper and lower horizontal shafts 24ª, and a pair of similar vertical shafts 25. The upper horizontal shaft 24, is geared, as at 26, to one of the vertical shafts, while the lower horizontal shaft is geared to the companion vertical shaft as at 27. On the shafts are latch bolts 28, which engage catches 29 on a door 30 hinged at 31 to the lower front portion of the retort. The door securing means forms no specific part of this invention, and will be covered in a separate application, hence it is not deemed necessary to describe the parts in detail.

The door 30 comprises a plate 32, to the front of which is fastened a series of vertically disposed I beams 33, and at the ends are angle irons 34, which together with other shorter angle irons form a frame to which is fastened an outer strengthening frame 35. Near the outer edge portion of the plate 32 is a gasket bearing plate 36, and to the face of this plate is fastened by bolts 37 a bearing plate of brass, indicated at 38. The bolts 37 extend through washers 39, fitted in the openings formed in the bearing plate 36, the bolts engaging threaded openings 39 in the said plate. The bearing plate 38 cooperates with a packing secured to the front surface of the retort. The packing consists of a plate 40 formed with openings in which are sealed washers, and over the plate 40 is fitted a brass gasket carrying plate 42, same being held in place by screws 43, extending through the washers and into the end frame 17. To the front face of the plate 42 is attached a gasket composed of lead strips 44, held in position by screws 45, and against which the plate 38 on the door fits to form a seal when the door is closed.

The door is hinged to the lower front portion of the retort, and to provide a slight bodily movement of the door when same is in either opened or closed position, it is essential that special means be provided to effect the hinging connection. To the bottom of the door are fastened pairs of abutting brackets 46, slotted at 47, and to opposite sides of these brackets are secured plates 48. The lower shaft passes through the openings formed by the terminal of the slots in the abutting plates and the edges of the plate 48, the width of the slots equals the diameter of the lower shaft, but the spaces between the terminal walls of said slots and the edge of the plate 48, are greater than the diameter of the shaft, with the result that the door will have a slight independent bodily movement on the shaft, when opened or closed.

Figure 15:
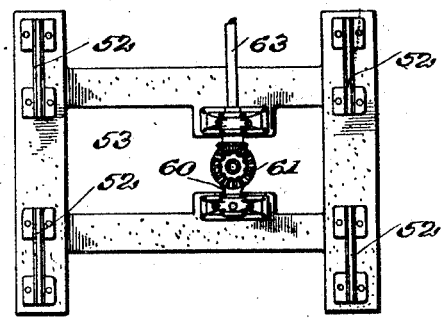
Fig. 15 is a detail plan view of the pit in which the door operating mechanism is housed.

On the inside of the door is a track 50 aligned with the transfer track 10 when the door is open and in a horizontal position. It is essential that when the door is in this position that it be properly supported to relieve the weight from the hinges, and bear the weight of the load being moved to and from the retort. To do this short rails 52 are mounted on the upper edges of the walls of a concrete pit 53, as shown in Fig. 15.

Owing to the size and weight of the door it is quite necessary to provide means for quickly and conveniently opening and closing same. Secured to one of the I beams of the door is a pair of ear plates 54, and fitted between same is a yoke 55, mounted on a pivot pin 56. Extending from the yoke 55 is a screw 57, which extends through a threaded nut 58, mounted in ball bearings in a yoke 59, and provided with a bevelled pinion 60. The yoke 59 is provided with aligned bearings 61, mounted in bearings 62, supported on the upper ends of the pit 53. Mounted in one of the bearings 61 is a shaft 63, and on the end of the same is a beveled pinion 64, which meshes with the beveled pinion 60. The shaft 63 extends laterally from the yoke and is provided with a clutch member 64, which cooperates with a companion clutch member 65, operated by a motor 66. A hand lever 67 controls the movement of the clutch in the operation of the door.

Located above the retorts is a closed reservoir 70 to supply water to the plant. From the reservoir depends a supply pipe 71 and from the lower ends of the latter extends two branch pipes 72 and 73, connecting with a pair of lower headers 74 and 75, which are located under the two retorts 12 and 13 and which are connected with the bottom of the latter by branch pipes 76. In the bottom of the supply pipe 71 is a valve 77, to cut off the supply for a purpose to be hereinafter referred to, and in the branch pipes 72 and 73 are valves 78 and 79. Extending from the branch pipes 72 and 73 are branch pipes 80 and 81, provided with valves 82 and 83, and intermediate the valves extends a short pipe section 84, leading to a coupling 85.

From opposite sides of the coupling extend branch pipes 86 and 87, provided with valves 88 and 89. From the branch pipes 86 and 87 extend vertical pipes 90 and 91, leading into upper headers 92 and 93, connected to the top part of the retort by short pipe sections 94. Communicating with the coupling 85 is a pipe 95 which leads into the tank 2 of the sweat chamber 1.

Coupled with the upper headers 92 and 93 are vertical pipes 96 and 97, provided with valves 98 and 99. The pipes 96 and 97 communicate with a pipe 100, leading to a vacuum pump 101, and extending from the opposite side of said pump is a pipe 102, which communicates with the pipe 95, leading to the tank 2. Communicating with the front ends of the lower headers 74 and 75, is a pipe 103, having a branch 104ª, communicating with the pipe 100, and each side the branch pipe, the pipe 103 is provided with valves 104 and 105.

At the juncture of pipes 96 and 100 extends a pipe 105, having a valve 106 and leading to a centrifugal pump 107. From the opposite side of the pump leads a pipe 108 which communicates with branch pipes 109 and 110, leading to the lower headers 74 and 75, valves 111 and 112 being provided to control said branch pipes.

From the bottom of the supply pipe leads a pipe 113 communicating with a pump 114, and having a valve 115. From the pump 114 leads a pipe 116, having a valve 117, and leading to the bottom of the tank 2 in the sweat chamber. Two pipes 118 and 119 connect the two retorts 12 and 13 and from each of said pipes extends a branch pipe 120 which enters the top of the reservoir. In these pipes 118 and 119, are valves 121 and 122, and automatic relief valves 123.

Perforated steam pipes 124 extend into the lower headers 74 and 75 to supply steam to the water when same enters the retorts.

In the top of the retorts will be arranged a series of pipes 125, and 126, to introduce cold water sprays, or steam if desired, and in the bottom of said retorts are arranged pipes 127 and 128, to supply heat and steam when desired. These pipes may be so connected to take steam from the system of pipes described, or may be sufficed from some convenient outside source. When cold water is used the supply of course will come from an outside source.

The plant described is primarily intended for the treatment of wood, whether it be for the purpose of drying, removing the extractives from the wood, or making pulp. However, the plant is in no way limited to the particular field of wood and plant substance treatment, as it is evident it may be employed in digesting or recovering by-products from any other material where heat, vapor, chemicals and other solvents are essential to dissolve and remove the essential constituents, such as gums, oils and other volatile compounds. It is therefore to be understood that the invention is in no way to be construed as being limited to any one particular art, hence when using the terms wood or plant substance, this is to be construed as merely for convenience in defining the action and result accomplished, and is to be taken to mean any material subject to treatment in the plant.

Wood is loaded on cars 130 which are then placed on transfer cars 131, which are moved on to the track 7 to a point opposite the storage tracks 8. The transfer cars are then moved onto the transfer tracks, if storage is desired otherwise the transfer car 131 and its load of wood is moved opposite the entrance of the sweat chamber 1, the door is opened, and the transfer car and its load is moved into the chamber to be subjected to the first step in the treatment.

At this point it may be well to understand that the water in the reservoir is heated by coils 140, or otherwise, it being contemplated to maintain the water at a temperature, at or about the boiling point. It may also be stated and it is to be understood that the water in the reservoir may be initially charged with extractive of wood, or other chemicals or compounds, or it may be free of such chemicals, this depending entirely upon the purpose to be accomplished by the plant. However, to make the operation clear, let it be assumed that the hot water in the reservoir is charged with volatile extractives from wood.

After the water is heated to the desired degree, it is essential that the retorts be heated, and sufficient hot water be conveyed to the tank 2 in the sweat chamber 1. Hence for preliminarily heating the system, the valves 77, 78, 79, are opened, pressure in the retorts being relieved by opening valves 121, and valves 88 and 89. When these various valves are opened the column of water in the pipe 71, flows rapidly through the branch pipes 80 and 81, to the lower headers 74 and 75, and into the bottom of the retort, steam in the meantime being introduced through the perforated pipes 124 to augment the temperature of the water, the air from the retorts being forced through pipes 118 and 119 and into the reservoir, and through the upper headers 92 and 93, through branch pipes 90 and 91, and the pipe 95, to the tank 2. Assuming now the retorts have been filled with hot water, and the various surfaces heated, the valve 77 is closed, and valves 82 and 83 are opened and the water rapidly flows by gravity through the intermediate connections to the drain pipe 95, and into the tank 2 in the bottom of the sweat chamber 1. Thus the tank and the chamber are heated and vapor from the water therein is given off and acts on the material carried by the cars to treat said material in a manner to be described.

As the hot water is from time to time conveyed to the tank 2 to maintain vapor in the chamber, and as this water must be kept in circulation for reheating it may be well to make it plain at this time that pump 114 is constantly operated to convey the water from the tank through return pipe 113, and into the supply pipe 71, the flow of water into the supply pipe being controlled by valves 142, and 115.

The retorts and the sweat chamber having been heated by the hot water and steam the vapors 82 and 83, 121 and 122 are closed, and the load of material in the sweat chamber is subjected to the rising vapors and the steam supplied thereto. As the sweat chamber is substantially air tight, it follows that the vapor from the water in the tank and the steam will soften and dissolve the soluble constituents in the cells in the wood, and othewise condition the material for further and subsequent rapid treatment.

It is to be remembered that this vapor is necessarily charged with volatile extractives whether such extractives be as a result of initially clearing the water in the reservoir, or as a result of collection and mixture with the vapors given off by the material being treated in the retort, as will presently appear. This being true it follows that the charged vapors will penetrate the structure of the material being treated and as the pores are opened up the interior of the material will be attacked by the extractives and will as a consequence dissolve and liberate like constituents in the form of vapor, which when liberated enriches the vapor in the chamber and enhances its value as a means for acting on the material being treated. This treatment is prolonged for sufficient time to insure of complete softening of the entire body of the material being treated, the period of time of treatment depending entirely upon the nature and character of the material, and the purpose for which it is to be used and the character of the extractives to be conserved. After the load of material is sufficiently treated in the sweat chamber, the car is moved out the opposite end of the chamber and onto a transfer car on the adjacent track 9, or it may be moved across one of the intermediate cars on track 11 to the companion track 10, this of course depending upon which of the retorts is to be used. The door of the retort to be used is opened to form a continuation of the track, as shown in Fig. 2, and the load is pushed into the respective retort.

Before the load of material is pushed into the retort the two cars 130 and 131 are locked together by latches 145, to hold the cars and load in fixed position when submerged in the water in the retort. Then to prevent the cars with their loads floating in the retort, the tracks are of U form, and plates 146 on the transfer cars fit under the flanges of the U rails and therefore hold the cars and their loads against a floating movement. Furthermore, if the material being treated is wood, it is tied transversely to hold the mass in bulk during treatment in the retort. This is true of any material being treated. That is the mass must be held against floating movement so as to be conveniently moved in and out of the retort, and prevent the material becoming separated and scattered during treatment.

Before going into the various steps of the treatment in the retort, it will be advantageous at this time to describe the operation of the door, since this is one of the essential actuations to be met in handling a door of this size and at the same time insuring of an air tight seal.

Figure 14:
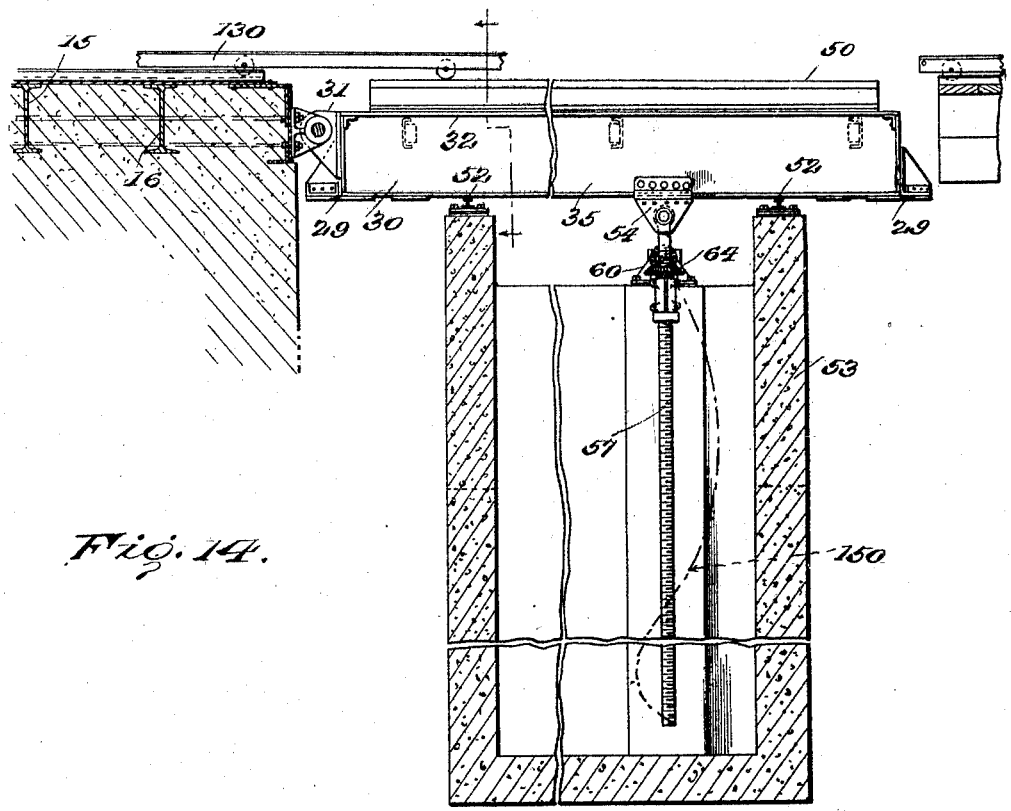
Fig. 14 is an enlarged detail section of the retort door and operating mechanism.

The door at this time is open (see Fig. 2) and is supported on the short rail sections on pit 53, the operating screw being housed in said pit. In order that the door will be substantially free to rest snugly on the rails, and be under perfect control of the operator, the hinge connection is so constructed that at this time there is a slight lost motion between the parts, incident to the elongated opening between the hinges and the supporting shaft. Due to this lost motion when the door is opened, the operator, can by careful manipulation of the operating lever control the action of the clutch and the power draft, as to easily and lightly lower the heavy door until it finds its seat. In closing the door, the motor is reversed, and the clutch is thrown in, and through the bevelled gears, the nut is rotated and the screw is fed upwardly, and through the pivotal yoke connection, the screw following an irregular course indicated by the line 150, in Fig. 14. As the door approaches its closing position, the slots at the hinge connections again come into play, and there is a slight lost motion to permit the door to be bodily moved to form a proper seating and sealing of the packing. At this time the operator carefully manipulates the clutch until the door fits flat against the packing and stops; by turning a hand wheel the various shafts are rotated and the latches are brought into play and the final sealing of the door takes place. When the latter takes place the latches operate to pull the door tight against the end of the retort and through the medium of the packing previously described, an effective air and water tight seal is provided. The lost motion at the hinge connection permits of the latches acting directly on the door, wholly independent of the raising and lowering screw, hence if there is a slight irregularity in the meeting surfaces the parts cannot only move to make it fit, but the door can likewise yield sufficiently to accomplish the desired result.

Going back to the treatment of the material in the retort, it is to be borne in mind that the load is in position, the retort is sealed and its surfaces have been previously heated so that when the hot wood comes from the sweat chamber, it is immediately surrounded by a heated atmosphere, and in its transfer from the sweat chamber to the retort, the difference between its internal temperature and atmospheric temperature causes a surfacewise movement of the moisture, which tends to improve the condition of the material for treatment in the retort.

Assume one retort is to be operated, and it is desired to draw a vacuum, valve 98 is opened, and to insure of any water being drawn from the lower header 74, valve 105 is opened, and the vacuum pump 101, is started, and discharges through pipe 102, and into discharge pipe 95, and into tank. Sufficient vacuum is drawn to withdraw the air and moisture from the retort, and to open up the structure of the material being treated. This action also withdraws moisture and vapors from the interior of the material, and as these contain more or less of the volatile extractives it is of importance that same be conserved, hence the vapors and moisture withdrawn are discharged into the tank to enrich the water, and to act on the load of material being subjected to the sweating process at the same time the load is being treated in the retort. The vacuum step having been completed, valves 95 and 105 are closed, valves 77 and 78 are opened, and hot water rapidly flows through the lower header 74, and into the bottom of the retort, and in case of excess pressure accumulating in the tank, relief valves 123, will open. As the water rushes in the retort the vacuum is broken, and steam is introduced through the perforated pipe 124, and if additional heat is required steam and heat may be obtained from the pipes in the bottom of the retort. The water is introduced until it reaches the branch pipes 94, of the upper header 92, which is sufficient to submerge the load of material being treated, then valve 77 is closed. The water from the reservoir is at or about the boiling point, but by the introduction of steam in the retort the water becomes superheated. That is its temperature is increased above 212° F., and the pressure is correspondingly increased above atmospheric. If it be desired to lower the pressure after the material is sufficiently treated in the superheated water valve 89 may be opened and the charged vapor will be discharged through pipe 95, and into the tank. Or if the mixture in the tank is rich enough for the purpose of the treatment the valves 123, may be opened and the vapors will then be discharged into the top of the reservoir and the contained extractives intermixed with the water to further enrich it.

It is sometimes advisable to draw a vacuum above the water in the treatment of certain materials and to accomplish this step, valve 98 is opened, and the air and moisture above the water is drawn through header 92 and the vacuum pump 101 is started and discharges into the tank as previously described. The material having been subjected to the superheated water treatment to extract the soluble constituents, and melt the insoluble constituents, or if the material is of such nature as will disintegrate and liberate the volatile and other extractives by the action of the water and vacuum, and it is desired to remove the water this can be accomplished in two ways. First, open valve 80 and close valve 78, and the water will by gravity flow through header 74, branch pipes 72 and 84, and pipe 95, direct to the tank, the water carrying with it all the extracted constituents which in each successive operation is enriched to act on the material in the presweat chamber, and to act on subsequent loads of material treated in the retort. Second, the water may be removed from the retort previously in use, to the adjacent retort by opening valves 78 and 79, the water thus passing through the header 75, and into the adjacent retort. To accomplish this however it is necessary that pressure be maintained in the retort first containing the water, and to facilitate the transfer valves 9 may be opened to relieve the pressure in the receiving tank, the vapor however being conserved in the reservoir.

It frequently happens in a plant of this character that the water in the retort be circulated to create a current to act on the material being treated to effectively remove and dislodge certain of the constituents and to lend friction sufficient to assist in the dissolving action, and to thereby mix throughout the entire body of liquid constituents which are not in water. This may be accomplished by opening valve 17 in pipe 109, and opening valve 106 in pipe 105, and starting the circulating pump 107. This will draw the water from one end of the lower header 74, and convey it to pipe 96, and deliver it at the opposite end of the upper header 92. In this way the water may be circulated as long as may be desired to accomplish the desired result.

In the treatment of any particular substance, one of the foregoing steps can be repeated, or the steps can be reversed, the valves and pipes being so arranged as to take care of this contingency.

After the treatment in either of the retorts is completed the door is opened, and the load is moved out on the track on the door to the transfer track to a point opposite a kiln, and if drying is necessary the load is transferred to said kiln. When the substance is under treatment in the sweat chamber, a spray of cold or hot water may be introduced at the top, or if desired the vapor may be reheated and introduced again to the chamber to act on the wood. These steps may or may not be carried out in sequence, and may only be employed when it is desired to obtain certain specific substances.

From the foregoing description it will be seen that I have provided a convenient and economical plant arrangement for treating and drying various products, or for extracting various constituents from material and substances being treated. Furthermore, by the arrangement of the parts described the vapors and all the contained complex extractives removed from the material under treatment, are conserved, and employed in the treatment to act in effecting the necessary result.

In operating a plant of this character it is not on vital from a commercial and practical standpoint to use as little water as possible, but it is equally important to insure of the retention of the collected extracts in the water that they may subsequently separate and utilize as by-products. It is with this in view that I have so arranged the parts that the same body of water is used in the various treatments, which obviously in subsequently treatments will be enriched and rendered more valuable. This is particularly true when treating wood or plant substances containing a high degree of soluble and insoluble constituents.

What I claim is:

1. A wood treating plant comprising a reservoir, a retort in which wood is to be treated in super-heated water, a sweat chamber and tank in which wood is pre-sweated before entering the retort, means for conveying the water from the reservoir to the retort to submerge the wood, means for conveying the water from the retort to the tank, and means for pumping the water from the tank to the reservoir for re-use.

2. A wood treating plant comprising a reservoir, a retort, means for pre-sweating the wood, a system of valves and pipes for first conveying the water to the retort and after treatment conveying the water to the pre-sweating means to utilize the vapors arising from the water to promote a sweating action, and thence return the water to the reservoir, and means for forcing the return of the water to the reservoir.

3. A plant for treating substances to extract the contained constituents comprising a retort, a pre-sweat chamber, a reservoir, means for creating a vacuum in the retort and discharging the air and moisture in the pre-sweat chamber, and means for introducing heated water to the tank and super-heating same, means for conveying the water from the retort and discharging same into the pre-sweat chamber, and means for conveying the water from the pre-sweat chamber to the reservoir.

4. A plant for treating substances to extract the contained constituents, comprising a retort having a track, a pre-sweat chamber having a track, tracks between the chamber and the retort, a door for the retort, a track on the door, cars for conveying material on the track in the chamber and over the track between the retort and chamber and the track on the door to the track in the retort, means for opening and closing the door, means for creating a vacuum in the retort, means for introducing heated water to the retort, and means for circulating the water through the chamber and retort.

5. In a plant of the class described, the combination of a pair of retorts, pipes connecting the retort and provided with valves, a reservoir with which the said pipes communicate, a header for each retort, a pipe communicating with the reservoir and the headers, valves for controlling the flow of water from the pipe to the respective headers, means for creating pressure in the retorts, means whereby pressure in the retort when the valves are opened will force the water from one retort to the other, and means for returning the water to the reservoir.

6. In a plant of the class described, the combination of a reservoir, a retort, a header to supply water to said retort, a pipe communicating with the header, and the reservoir, valves in said pipe, a discharge pipe communicating with the previously mentioned pipe, a header at the top of the retort, a pipe connection and a valve between the upper header and the discharge pipe whereby air and moisture may be conveyed from the top of the retort, a vacuum line connected with the upper header and provided with a valve, whereby to draw a vacuum in the retort, and means for returning the water from the discharge pipe to the reservoir.

7. In a plant of the class described, the combination of a retort, having upper and lower headers, a reservoir for supplying the retort with water through the lower header, valves for controlling the water, a tank, means for conveying the water from the retort to the tank, means connected with the upper header for creating a vacuum in the retort and discharging same in the tank, a valve for controlling the vacuum, and means for conveying the water from the tank to the reservoir.

8. In a plant of the character described, the combination of a reservoir, a retort, a supply pipe communicating with the reservoir and the retort, controlling valves in said pipe, a discharge pipe communicating with the supply pipe, a vacuum pipe communicating with the retort and the discharge pipe, a tank into which the discharge pipe empties, a pipe communicating with the retort and the reservoir, a valve in said pipe, and means for returning the water from the tank to the reservoir.

9. In a plant of the character described, the combination of a retort having a hinged door adapted to be opened to a horizontal position and on which a car may travel into and out of the retort, means for opening and closing said door, means for supplying the retort with water, a tank into which the water may be discharged, means for drawing a vacuum in the retort and discharging the air and moisture into the tank, a reservoir, and means for returning the water from the tank to the reservoir.

10. In a plant of the class described, the combination of a closed presweat chamber formed at its bottom with a tank, a retort, a closed reservoir adjacent the retort, a pipe connecting the reservoir with the retort, a valve for controlling the flow of water through said pipe, a discharge pipe connecting the retort with the closed tank, a valve in the discharge tank, a vacuum pump and pipe communication with the upper portion of the retort and discharging into the closed tank, a valve in the vacuum pipe, and means for returning the water from the closed tank to the closed reservoir.

11. In a plant of the class described, the combination of a reservoir, a retort, upper and lower headers on the retort, a supply pipe communication with the lower header, and the reservoir, a valve for controlling the water passing through the supply pipe, a discharge pipe communicating with the supply pipe, a circulating pipe and pump connecting the lower header with the upper header, a valve for controlling the circulating pipe, means for creating a vacuum in the retort, and means for returning the water discharged through the discharged pipe to the reservoir.

12. In a plant of the class described, the combination of a closed reservoir, means for heating the reservoir, a retort, supply pipe communicating with the reservoir and the retort, a valve for controlling the flow of water through the supply pipe, heating means for heating the water while being introduced to the retort, a discharge pipe, a tank into which the discharge pipe empties, means for creating a vacuum in the retort and discharging the air and moisture into the tank, and means for returning the water from the tank to the reservoir.

13. In a plant of the class described, the combination of a reservoir, a retort, upper and lower headers communicating with the retort, a supply pipe communicating with the reservoir and the lower header, a controlling valve in the supply pipe, a discharge pipe communicating with the supply pipe, a tank into which the discharge pipe empties, a vacuum pump and pipe line communicating with the upper header and discharging the air and moisture into the tank, a valved pipe connection between the lower header and the vacuum line pipe, means for causing the water to circulate in the retort, and means for returning the water from the tank to the reservoir.

14. In a plant of the class described, the combination of a closed reservoir, a pair of retorts, supply pipes communicating with the reservoir and the retorts, valves for controlling the pipes, a discharge pipe communicating with the supply pipes, means for circulating the water in each retort, venting pipes connecting the top of the retorts, valves in the venting pipes, branch pipes connected to the venting pipes and leading to the reservoir, a tank into which the discharge pipe empties, a vacuum pipe and pump for drawing a vacuum in the retorts, valves for controlling the vacuum pipe, branch pipes connected with the lower headers and the vacuum pipe, and means for returning the water from the tank to the reservoir.

15. In a plant of the class described including a chamber in which the material is to be treated, means for supplying the chamber with heated moisture, means for superheating the moist vapors and returning same to the chamber to subsequently act on the material, and means for subsequently treating the material in heated water after treatment in the chamber.

16. In a plant of the class described including a chamber in which the material is to be treated, means for supplying the chamber with heated moisture, means for causing the moist vapors to be circulated in the chamber, means for super-heating the vapors being circulated, and means for subsequently treating the material in heated water after treatment in the chamber.

17. In a plant of the class described including a chamber in which the material is to be treated, means for supplying the chamber with heated moisture, means for introducing steam, heated air, or a spray to the chamber, means for super-heating the moist vapors and returning same to the chamber to subsequently act on the material, and means for subsequently treating the material in heated water after treatment in the chamber.

18. In a plant of the class described including a chamber in which the material is to be treated, means for creating a heated moist atmosphere in the chamber, means in the chamber for spraying the heated and moistened material with water to condense the vapors, and means for subsequently treating the material to heated water after treatment in the chamber.

19. In a plant of the class described, the combination of a chamber having a pit at its bottom, a track located above the pit, means to provide the pit with water below the track, means to create a moist atmosphere in the chamber, means communicating with the tank and leading to the source of supply of water to return said water to said source of supply.

20. A plant of the character described comprising a sweat chamber open at opposite ends, a track adjacent one open end of said chamber, a track longitudinally disposed in said chamber, a track adjacent the opposite end of chamber, a retort in alignment with the last mentioned track, a short track section in the retort, said retort having a swing-door provided with a track in alignment with the last mentioned track adjacent the chamber, and the short track section in the retort when the door is open, cars for conveying the material over the tracks to the sweat chamber and retort, a reservoir for supplying the retort with heated water, means for super-heating the water in the retort, means for conveying the water from the retort to the sweat-chamber, and means for conveying the water from the sweat chamber to the reservoir.

21. In a plant of the character described, the combination with a sweat chamber, a pair of retorts, a reservoir, means for conveying the water from the reservoir to either or both retorts, means for conveying the water from one retort to the other, means for conveying the water from one or both retorts to the sweat chamber, means for returning the water from the sweat chamber to the reservoir, means for drawing a vacuum in one or both the retorts, and means for creating pressure in one or both of the retorts.

22. In a plant of the character described, the combination of a sweat chamber, means associated therewith for introducing a spray of water to the material being treated, a retort in which the material is subsequently treated, and pipes connecting the retort and the sweat chamber.

23. In a plant of the character described, the combination of a sweat chamber, means for collecting vapor arising from the chamber and re-heating same and again introducing the re-heated vapor to the chamber, a retort in which the material is subsequently treated, and pipes connecting the retort and the sweat chamber.

24. In a plant of the character described, the combination of a sweat chamber, means associated therewith for introducing a spray of water to the material being treated, means for collecting vapor arising from the chamber and re-heating same and again introducing the re-heated vapor to the chamber, a retort in which the material is subsequently treated, and pipes connecting the retort and the sweat chamber.

25. In a plant of the character described, the combination of a sweat chamber having means therein for spraying material being treated with water, a retort having means therein for spraying material being treated, a reservoir, means connecting the reservoir with the retort, means connecting the retort with the sweat chamber, and means connecting the sweat chamber with the reservoir, whereby the water from the reservoir can be circulated through the retort and the sweat chamber and back to the reservoir.

26. In a plant of the character described, the combination of a sweat chamber having closures at opposite ends, a track adjacent one end, tracks at each side the sweat chamber, a pair of tracks at the opposite end of the sweat chamber, a retort located in alignment with each of the last named pair of tracks, a door at the end of each retort, a track on the inside of same to match with the pairs of tracks when the doors are opened, a track in each retort in alignment with the pairs of tracks, cars adapted to move over the tracks to carry material to be treated in the sweat chamber and subsequently in the retorts, means in the sweat chamber for treating the load of material, means in and adjacent the retorts to subsequently treat the material in said retorts, pipes connecting the sweat chamber and retorts, a reservoir, pipes connecting the reservoir and the retorts, pipes connecting the reservoir and the sweat chamber, and valves for controlling said pipes.

27. In a plant of the character described, the combination of a sweat chamber, a track in the sweat chamber, a retort, a track in the retort, a door on the retort, a track on the inside of the door, a transfer track intermediate the sweat chamber and the retort and in alignment with track in the retort and the track on the inside of the door when the latter is open, means connecting the door to the retort to permit independent bodily movement of the door to properly seal same when closed and to permit of proper alignment with the transfer track when the door is open, and interconnected means in the retort and sweat chamber to cooperate in the treatment of material.

28. In a plant of the class described, the combination of a sweat chamber having thereunder a tank, a retort having therein heating means and perforated pipes, a reservoir, pipes communicating with the reservoir and the retort to supply heated water thereto, valves for controlling said pipes, pipes communicating with the sweat chamber and the retort, valves for controlling said last mentioned pipes, means for conveying the water from the sweat chamber to the reservoir, means for returning the water from the retort to the reservoir, and transfer tracks and cars between the sweat chamber and the retort whereby to convey material being treated from the sweat chamber to the retort and from the latter.

29. In a plant of the class described, the combination of a retort, a track in the retort, cars operating on the track to carry material to be treated in the retort, means between the car and the track to secure the car against floating movement, means for supplying the retort with water to submerge the material on the car, and means for heating the water.

30. In a plant of the class described, the combination of a retort having a track therein, a closure for the retort, a track on the inside of the closure which when the door is in open position registers with the track in the retort, a car, means for locking the load of material being treated to the car, means between the car and the track in the retort to hold the car and its load against floating movement in the retort, means for introducing water to the retort, and means for heating the water.

In testimony whereof I affix my signature.

FREDERICK K. FISH, Jr.